United States Patent
Wei

(10) Patent No.: US 10,807,281 B2
(45) Date of Patent: Oct. 20, 2020

(54) TRANSFERRING METHOD AND REPEATABLE TRANSFERRING METHOD

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/535,204

(22) PCT Filed: Jun. 27, 2016

(86) PCT No.: PCT/CN2016/087239
§ 371 (c)(1),
(2) Date: Jun. 12, 2017

(87) PCT Pub. No.: WO2017/166459
PCT Pub. Date: Oct. 5, 2017

(65) Prior Publication Data
US 2019/0009438 A1    Jan. 10, 2019

(30) Foreign Application Priority Data

Apr. 1, 2016    (CN) .......................... 2016 1 0203465

(51) Int. Cl.
*B29C 37/00*    (2006.01)
*B29C 33/38*    (2006.01)
(Continued)

(52) U.S. Cl.
CPC .............. *B29C 37/00* (2013.01); *B29C 33/38* (2013.01); *B29C 33/3842* (2013.01);
(Continued)

(58) Field of Classification Search
CPC ....................................................... B29C 37/00
See application file for complete search history.

(56) References Cited

U.S. PATENT DOCUMENTS

2006/0231728 A1    10/2006    Takamatsu et al.
2008/0001332 A1    1/2008    Kim et al.
(Continued)

FOREIGN PATENT DOCUMENTS

CN    101097399 A    1/2008
CN    101160337 A    4/2008
(Continued)

OTHER PUBLICATIONS

English language translation of WO 2011/111815.*
(Continued)

*Primary Examiner* — Larry W Thrower
(74) *Attorney, Agent, or Firm* — Brooks Kushman P.C.

(57) ABSTRACT

The present disclosure provides a transferring method and a repeatable transferring method. The transferring method includes steps of: performing surface modification treatment on a transferring surface of a transfer mold to reduce surface free energy of the transferring surface; forming a liquid material layer on the transferring surface after the surface modification treatment; curing the liquid material layer to form a solid material layer; and releasing the solid material layer from the transfer mold.

14 Claims, 2 Drawing Sheets

(51) Int. Cl.
  *B29C 33/40* (2006.01)
  *B29C 35/08* (2006.01)
  *B29C 41/12* (2006.01)
  *B29C 41/46* (2006.01)
  *B29K 67/00* (2006.01)

(52) U.S. Cl.
  CPC .......... *B29C 33/40* (2013.01); *B29C 35/0805* (2013.01); *B29C 37/0053* (2013.01); *B29C 41/12* (2013.01); *B29C 41/46* (2013.01); *B29C 35/0888* (2013.01); *B29C 2035/0827* (2013.01); *B29K 2067/003* (2013.01)

(56) References Cited

U.S. PATENT DOCUMENTS

| | | |
|---|---|---|
| 2011/0012273 A1 | 1/2011 | Hara |
| 2013/0171379 A1 | 7/2013 | Lim et al. |
| 2014/0322495 A1 | 10/2014 | Lee et al. |
| 2015/0292150 A1 | 10/2015 | Ikeda et al. |
| 2015/0298365 A1 | 10/2015 | Yukawa et al. |
| 2016/0046052 A1 | 2/2016 | Ito et al. |

FOREIGN PATENT DOCUMENTS

| | | | |
|---|---|---|---|
| CN | 101970198 A | | 2/2011 |
| CN | 103182878 A | | 7/2013 |
| CN | 103264586 A | | 8/2013 |
| CN | 103879218 A | | 6/2014 |
| CN | 104039560 A | | 9/2014 |
| CN | 104797432 A | | 7/2015 |
| CN | 104837886 A | | 8/2015 |
| CN | 104870185 A | | 8/2015 |
| DE | 202009005879 U1 | | 7/2009 |
| JP | H07237229 A | | 9/1995 |
| JP | 2006119423 A | | 5/2006 |
| TW | 200838840 A | | 10/2008 |
| WO | WO 2011/111815 | * | 9/2011 |

OTHER PUBLICATIONS

First Office Action for Chinese Application No. 201610203465.6, dated Oct. 27, 2017, 8 Pages.

International Search Report and Written Opinion for Application No. PCT/CN2016/087239, dated Jan. 9, 2017, 10 Pages.

* cited by examiner

TRANSFERRING METHOD AND REPEATABLE TRANSFERRING METHOD

CROSS-REFERENCE TO RELATED APPLICATIONS

This application is the U.S. national phase of PCT Application No. PCT/CN2016/087239 filed on Jun. 27, 2016, which claims priority to Chinese Patent Application No. 201610203465.6 filed on Apr. 1, 2016, the disclosures of which are incorporated in their entirety by reference herein.

TECHNICAL FIELD

The present disclosure relates to the field of transferring technology, in particular to a transferring method and a repeatable transferring method.

BACKGROUND

A conventional transfer mold is usually made of a resin material. However, resin monomers not cured completely may remain at a surface of the transfer mold. Due to a strong interactive force between the resin monomers and ultraviolet (UV)-curable resin as a to-be-transferred object, it is uneasy for a resultant product to be peeled off from the transfer mold. To overcome this drawback, as a conventional transferring technique, a silicon-based substance having a thickness of tens to hundreds nanometer (nm) may be sputtered onto the transfer mold through a low-temperature sputtering process. Due to an intermolecular force, the silicon-based substance may form a film. The resultant silicon-based film has relative low surface free energy, so a substance formed at a surface of the silicon-based film may be easily peeled off therefrom. However, the low-temperature sputtering process needs to be maintained at a temperature more than 60° C. for 30 minutes, and probably the surface of the transfer mold may be deformed, resulting in a decrease in the transfer accuracy. In addition, the intermolecular force of the silicon-based film is not so strong, an interactive force between the silicon-based substance and a substance having relatively small polarity is small, and an interactive force between the silicon-based substance and a substance having relatively large polarity is strong. Hence, in the case of transferring the substance having the relatively small polarity, a good transfer effect may be achieved, and in the case of transferring the substance having the relatively large polarity, a bad transfer effect may be achieved.

SUMMARY

An object of the present disclosure is to provide a transferring method and a repeatable transferring method, to prevent a surface of a mold from being deformed, improve the transfer accuracy, and improve the transfer effect in the case of transferring the substance having the relatively large polarity.

In one aspect, the present disclosure provides in some embodiments a transferring method, including steps of: performing surface modification treatment on a transferring surface of a transfer mold, to reduce surface free energy of the transferring surface; forming a liquid material layer on the transferring surface after the surface modification treatment; curing the liquid material layer to form a solid material layer; and releasing the solid material layer from the transfer mold.

In a possible embodiment of the present disclosure, the transfer mold is made of an organic material.

In a possible embodiment of the present disclosure, the step of performing the surface modification treatment on the transferring surface of the transfer mold includes irradiating the transferring surface of the transfer mold with a first UV ray.

In a possible embodiment of the present disclosure, the first UV ray has a power density of 60 W/cm$^3$ to 500 W/cm$^3$, and light energy of 800 mJ/cm$^2$ to 5000 mJ/cm$^2$.

In a possible embodiment of the present disclosure, the first UV ray has a power density of 80 W/cm$^3$ or 100 W/cm$^3$, and light energy of 2800 mJ/cm$^2$, 3000 mJ/cm$^2$ or 3100 mJ/cm$^2$.

In a possible embodiment of the present disclosure, the step of forming the liquid material layer on the transferring surface after the surface modification treatment includes forming a liquid, UV-curable resin layer on the transferring surface.

In a possible embodiment of the present disclosure, the step of curing the liquid material layer includes irradiating the liquid, UV-curable resin layer with a second UV ray, to form a solid, UV-cured resin layer.

In a possible embodiment of the present disclosure, the step of releasing the solid material layer from the transfer mold includes releasing the solid, UV-cured resin layer from the transfer mold.

In a possible embodiment of the present disclosure, the step of forming the liquid, UV-curable resin layer on the transferring surface includes: applying liquid, UV-curable resin onto the transferring surface; providing a polyethylene terephthalate (PET) substrate on the liquid, UV-curable resin; and enabling a pressure roller to rolling on the PET substrate in a predetermined direction, to form the liquid, UV-curable resin layer.

In a possible embodiment of the present disclosure, the second UV ray has a power density of 60 W/cm$^3$ to 80 W/cm$^3$, and light energy of 800 mJ/cm$^2$ to 1200 mJ/cm$^2$.

In a possible embodiment of the present disclosure, the second UV ray has a power density of 80 W/cm$^3$, and light energy of 800 mJ/cm$^2$ or 1000 mJ/cm$^2$.

In a possible embodiment of the present disclosure, the transferring method further includes performing heat dissipation on the transfer mold while performing the surface modification treatment on the transferring surface of the transfer mold.

In another aspect, the present disclosure provides in some embodiments a repeatable transferring method, including steps of: performing surface modification treatment on a transferring surface of a transfer mold, to reduce surface free energy of the transferring surface; forming a liquid material layer on the transferring surface after the surface modification treatment; curing the liquid material layer to form a solid material layer; releasing the solid material layer from the transfer mold; and taking the solid material layer as a new transfer mold, performing surface modification treatment on a transferring surface of the new transfer mold to reduce surface free energy of the transferring surface; forming a liquid material layer on the transferring surface after the surface modification treatment; curing the liquid material layer to form a solid material layer; and releasing the solid material layer from the new transfer mold.

In a possible embodiment of the present disclosure, prior to the step of performing the surface modification treatment on the transferring surface of the transfer mold, the repeatable transferring method further includes fixing the transfer mold onto a planar substrate.

In a possible embodiment of the present disclosure, the step of fixing the transfer mold onto the planar substrate includes fixing the transfer mold onto a glass substrate through UV-curable resin.

According to the transferring method and the repeatable transferring method in the embodiments of the present disclosure, the surface modification treatment may be performed on the transfer mold, thereby reducing the surface free energy of the transferring surface. Because an interatomic force of the transferring surface before the surface modification treatment is larger than an intermolecular force of the transferring surface after the surface modification treatment, it is able to achieve an excellent transfer effect in the case of transferring almost all substances. In addition, the surface modification treatment may be performed on the transfer mold at a low temperature, so it is able to prevent the surface of the transfer mold from being deformed due to a high temperature, thereby to improve the transfer accuracy and the manufacture efficiency, simplify a process procedure, and reduce the manufacture cost.

DETAILED DESCRIPTION

In order to make the objects, the technical solutions and the advantages of the present disclosure more apparent, the present disclosure will be described hereinafter in a clear and complete manner in conjunction with the drawings and embodiments.

First Embodiment

Figure 1:
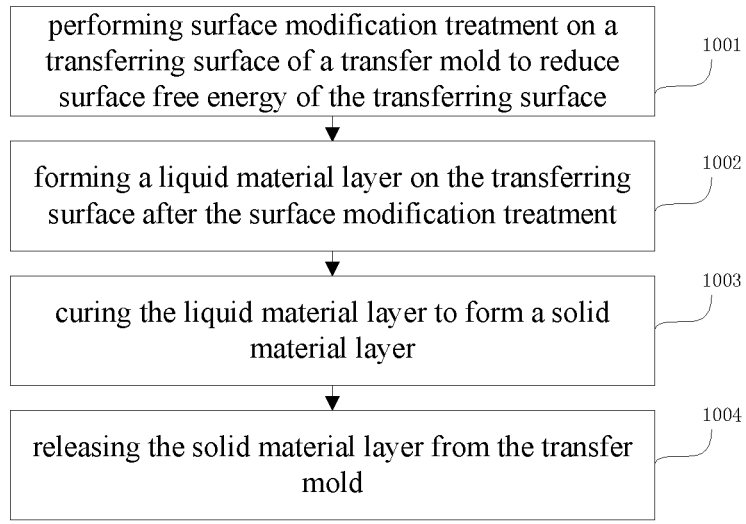
FIG. 1 is a flow chart of a transferring method according to a first embodiment of the present disclosure.

The present disclosure provides in the first embodiment a transferring method which, as shown in FIG. 1, includes the following steps.

Step 1001: performing surface modification treatment on a transferring surface of a transfer mold, to reduce surface free energy of the transferring surface.

In this embodiment, any mold capable of transferring a substance may serve as the transfer mold. To facilitate a transferring operation, the transfer mold may be fixed onto a planar substrate, to provide the transfer mold with excellent flatness. The planar substrate may be a glass substrate, and of course, it may also be a substrate made of any other materials. The transfer mold may be fixed onto the planar substrate through adhesion, and of course, any other fixation modes may also be applied. Usually, a conventional transfer mold is made of a resin material, and resin monomers not cured completely may remain at a surface of the transfer mold. Due to a strong interactive force between the resin monomers and UV-curable resin as a to-be-transferred object, it is uneasy for a resultant product to be peeled off from the transfer mold.

Figure 2:
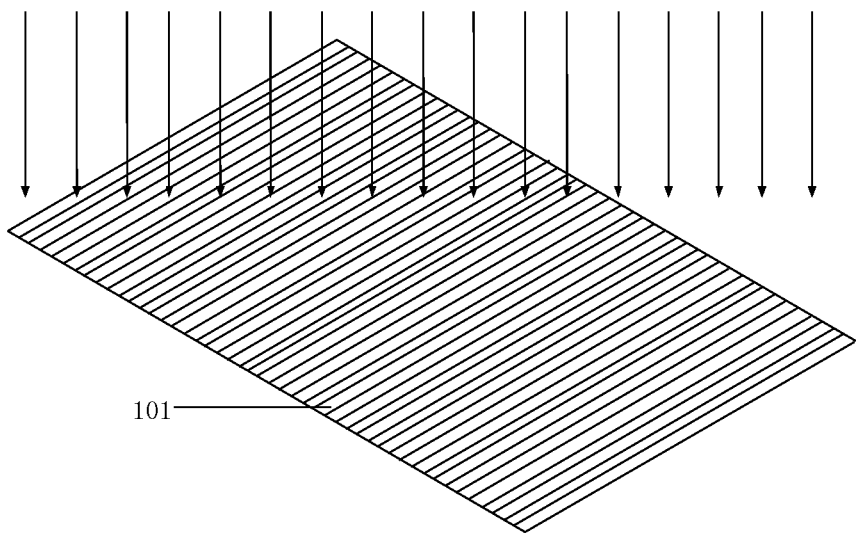
FIG. 2 is a schematic view showing surface modification treatment in the transferring method according to the first embodiment of the present disclosure.

As shown in FIG. 2, which is a schematic view showing the surface modification treatment in the transferring method according to the first embodiment of the present disclosure, the transferring surface of the transfer mold 101 may be irradiated with a UV ray. After the irradiation, the resin monomers which have not been cured completely and remain at the surface of the transfer mold 101 may continue to be cured or volatilized completely. In addition, active free radicals remaining at the surface of the transfer mold 101 may be removed by the UV ray, to prevent the continuous reaction of the active free radicals during the transferring operation of the transfer mold 101. Hence, through the surface modification treatment with the UV ray, it is able to completely or substantially completely cure the resin at the surface of the transfer mold 101. After the transferring surface of the transfer mold 101 is irradiated with the UV ray, it is able to reduce the surface free energy of the transferring surface. Prior to the surface modification treatment, an interatomic force mainly exists at the surface of the transfer mold 101, and subsequent to the surface modification treatment, an intermolecular force mainly exists at the surface of the transfer mold 101. Because the interatomic force of the transferring surface before the surface modification treatment is larger than the intermolecular force of the transferring surface after the surface modification treatment, it is able for the transferring method in the embodiment of the present disclosure to achieve an excellent transfer effect in the case of transferring almost all substances.

In this embodiment, the higher the power of the UV ray, the shorter the time period for the surface modification treatment on the transfer mold 101. The UV ray for the surface modification treatment on the transfer mold 101 may be provided by a high-power UV mercury lamp. In a possible embodiment of the present disclosure, the UV ray may have a power density of 60 $W/cm^3$ to 500 $W/cm^3$, and light energy of 800 $mJ/cm^2$ to 5000 $mJ/cm^2$. In another possible embodiment of the present disclosure, the UV ray may have a power density of 80 $W/cm^3$ or 100 $W/cm^3$, and light energy of 2800 $mJ/cm^2$, 3000 $mJ/cm^2$ or 3100 $mJ/cm^2$. In addition, heat dissipation treatment may be further performed on the transfer mold while performing the surface modification treatment on the transferring surface of the transfer mold. The heat dissipation treatment may be performed through an air conditioner or a fan, and of course, any other appropriate heat dissipation modes may also be applied.

The irradiation with the high-power UV ray may result in an increase in a temperature of the transfer mold and a temperature of a to-be-transferred material. In this embodiment, the surface modification treatment may be performed at a temperature from 0° C. to 60° C. In a possible embodiment of the present disclosure, the surface modification treatment may be performed at a temperature of 22° C. Through the surface modification treatment on the transferring surface of the transfer mold under the above-mentioned condition, it is able to change an organizational structure of the surface of the transfer mold 101 and reduce the surface free energy of the transferring surface, thereby to achieve a better transfer effect. In addition, it is able to prevent the surface of the transfer mold from being deformed due to the high temperature, thereby to improve the transfer accuracy and the manufacture efficiency, simplify the process procedure, and reduce the manufacture cost.

Step 1002: forming a liquid material layer at the transferring surface after the surface modification treatment.

Figure 3:
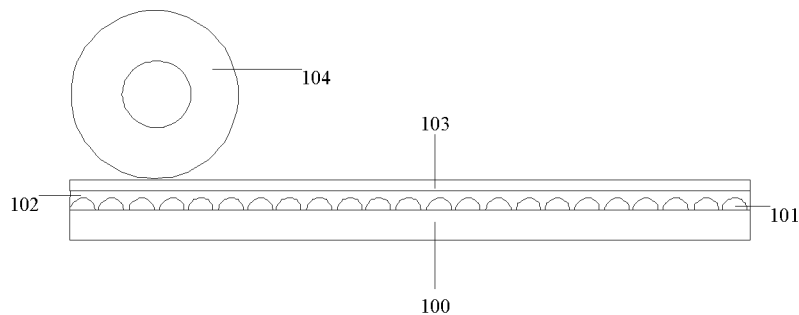
FIG. 3 is a schematic view showing the formation of a liquid material layer in the transferring method according to the first embodiment of the present disclosure.

In this embodiment, the step of forming the liquid material layer at the transferring surface after the surface modification treatment includes forming a liquid, UV-curable resin layer at the transferring surface. As shown in FIG. 3, which is a schematic view showing the formation of the liquid material layer in the transferring method according to the first embodiment of the present disclosure, the step of forming the liquid, UV-curable resin layer at the transferring surface includes: applying liquid, UV-curable resin onto the transferring surface of the transfer mold 101; providing a PET substrate 103 on the liquid, UV-curable resin; and enabling a pressure roller 104 to rolling on the PET substrate 103 in a predetermined direction, to form the liquid, UV-curable resin layer 102. To be specific, the liquid, UV-curable resin may be dripped onto the transferring surface of the transfer mold 101, and the PET substrate 103 may be arranged on the liquid, UV-curable resin. The pressure roller 104 may roll on the PET substrate 103 along a plane, so as enable the liquid, UV-curable resin to be uniformly distributed over the transferring surface of the transfer mold 101 due to gravity of the pressure roller 104, thereby to form the liquid, UV-curable resin layer 102. Also, a downward pressure may be applied by the pressure roller 104 onto the PET substrate 103, to achieve the uniform distribution of the liquid, UV-curable resin.

Referring to FIG. 3, prior to the step of performing the surface modification treatment on the transferring surface of the transfer mold, the transferring method further includes fixing the transfer mold 101 onto a planar substrate 100. In a possible embodiment of the present disclosure, the step of fixing the transfer mold onto the substrate includes fixing the transfer mold 101 onto a glass substrate through UV-curable resin. Here, the UV-curable resin (not shown) arranged between the transfer mold 101 and the planar substrate 100 is an adhesive for adhering the transfer mold 101 to the planar substrate 100. In actual use, any other adhesive may also be used. In this way, it is able to provide the transfer mold with excellent flatness.

Step 1003: curing the liquid material layer to form a solid material layer.

Figure 4:
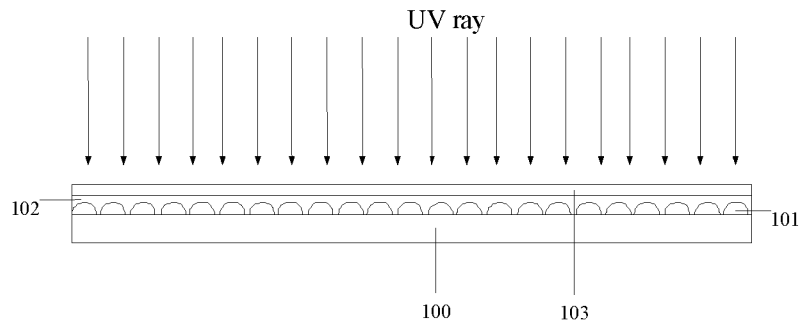
FIG. 4 is a schematic view showing a curing operation in the transferring method according to the first embodiment of the present disclosure.

As shown in FIG. 4, which is a schematic view showing a curing operation in the transferring method in the first embodiment of the present disclosure, the step of curing the liquid material layer includes irradiating the liquid, UV-curable resin layer 102 with a UV ray, to form a solid, UV-cured resin layer 102. In a possible embodiment of the present disclosure, the UV ray has a power density of 60 $W/cm^3$ to 80 $W/cm^3$, and light energy of 800 $mJ/cm^2$ to 1200 $mJ/cm^2$. In another possible embodiment of the present disclosure, the UV ray has a power density of 80 $W/cm^3$, and light energy of 800 $mJ/cm^2$ or 1000 $mJ/cm^2$. In this embodiment, the UV irradiation in FIG. 2 is performed to achieve the surface modification treatment on the surface of the transfer mold 101, to reduce the surface free energy of the transferring surface, while the UV irradiation in FIG. 4 is performed to cure the liquid resin, to convert the liquid resin into the solid resin.

Step 1004: releasing the solid material layer from the transfer mold.

Figure 5:
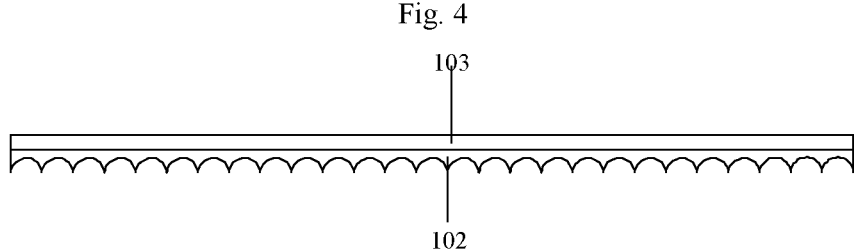
FIG. 5 is a schematic view showing a releasing operation in the transferring method according to the first embodiment of the present disclosure.

As shown in FIG. 5, which is a schematic view showing a releasing operation in the transfer mold according to the first embodiment of the present disclosure, the step of releasing the solid material layer from the transfer mold includes releasing the solid, UV-cured resin layer 102 from the transfer mold 101. The solid, UV-cured resin layer 102 is just a product resultant from the transferring method. The PET substrate 103, as a substrate for the solid, UV-cured resin layer 102, may be used to support and fix the solid, UV-cured resin layer 102. The solid, UV-cured resin layer 102 is of a micro structure formed by transferring, and it may be used as a new transfer mold, or as an anti-reflection (AR) film (a screen protector), a diffusion film or an optical lens. These products may be used in such fields as semiconductor materials, optical materials, storage mediums, micro-electronics, biotechnologies and environmental protection.

According to the transferring method in the first embodiment of the present disclosure, the surface modification treatment may be performed on the transfer mold, to reduce the surface free energy of the transferring surface. Because an interatomic force of the transferring surface before the surface modification treatment is larger than an intermolecular force of the transferring surface after the surface modification treatment, it is able to achieve an excellent transfer effect in the case of transferring almost all substances. In addition, the surface modification treatment may be performed on the transfer mold at a low temperature, so it is able to prevent the surface of the transfer mold from being deformed due to a high temperature, thereby to improve the transfer accuracy and the manufacture efficiency, simplify a process procedure, and reduce the manufacture cost.

Second Embodiment

Figure 6:
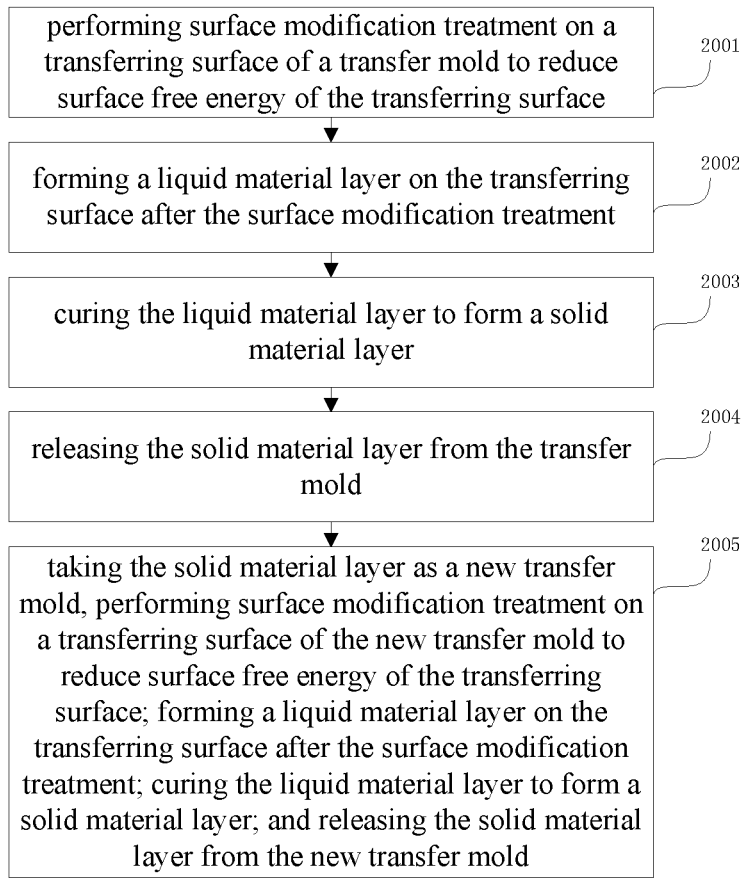
FIG. 6 is a flow chart of a repeatable transferring method according to a second embodiment of the present disclosure.

The present disclosure further provides in the second embodiment a repeatable transferring method which, as shown in FIG. 6, includes: Step 2001 of performing surface modification treatment on a transferring surface of a transfer mold, to reduce surface free energy of the transferring surface; Step 2002 of forming a liquid material layer on the transferring surface after the surface modification treatment; Step 2003 of curing the liquid material layer to form a solid material layer; Step 2004 of releasing the solid material layer from the transfer mold; and Step 2005 of taking the solid material layer as a new transfer mold, performing surface modification treatment on a transferring surface of the new transfer mold, to reduce surface free energy of the transferring surface; forming a liquid material layer on the transferring surface after the surface modification treatment; curing the liquid material layer to form a solid material layer; and releasing the solid material layer from the new transfer mold.

A product resultant from Steps 2001 to 2004 may be used as a new transfer mold, and then Steps 2001 to 2004 may be repeated, to acquire an actually-desired model through two transferring operations. The transferring procedure in the second embodiment is identical to that in the first embodiment, and thus will not be particularly defined herein.

Referring to FIG. 3, prior to prior to the step of performing the surface modification treatment on the transferring surface of the transfer mold, the transferring method further includes fixing the transfer mold 101 onto a planar substrate 100. In a possible embodiment of the present disclosure, the step of fixing the transfer mold onto the substrate includes fixing the transfer mold 101 onto a glass substrate through UV-curable resin. Here, the UV-curable resin (not shown) arranged between the transfer mold 101 and the planar substrate 100 is an adhesive for adhering the transfer mold 101 to the planar substrate 100. In actual use, any other adhesive may also be used. In this way, it is able to provide the transfer mold with excellent flatness.

According to the repeatable transferring method in the embodiments of the present disclosure, the surface modification treatment may be performed on the transfer mold, to reduce the surface free energy of the transferring surface. Because an interatomic force of the transferring surface before the surface modification treatment is larger than an intermolecular force of the transferring surface after the surface modification treatment, it is able to achieve an excellent transfer effect in the case of transferring almost all substances. In addition, the surface modification treatment may be performed on the transfer mold at a low temperature, so it is able to prevent the surface of the transfer mold from being deformed due to a high temperature, thereby to improve the transfer accuracy and the manufacture efficiency, simplify a process procedure, and reduce the manufacture cost.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transferring method, comprising steps of:
   performing surface modification treatment on a transferring surface of a transfer mold to reduce surface free energy of the transferring surface, wherein, the surface modification treatment is performed at a temperature in a range from 0° C. to 60° C.;
   performing heat dissipation on the transfer mold while performing the surface modification treatment on the transferring surface of the transfer mold;
   forming a liquid material layer on the transferring surface after the surface modification treatment;
   curing the liquid material layer to form a solid material layer; and
   releasing the solid material layer from the transfer mold.

2. The transferring method according to claim 1, wherein the transfer mold is made of an organic material.

3. The transferring method according to claim 2, wherein the step of performing the surface modification treatment on the transferring surface of the transfer mold comprises irradiating the transferring surface of the transfer mold with a first ultraviolet (UV) ray.

4. The transferring method according to claim 3, wherein the first UV ray has a power density of 60 $W/cm^3$ to 500 $W/cm^3$, and light energy of 800 $mJ/cm^2$ to 5000 $mJ/cm^2$.

5. The transferring method according to claim 4, wherein the first UV ray has a power density of 80 $W/cm^3$ or 100 $W/cm^3$, and light energy of 2800 $mJ/cm^2$, 3000 $mJ/cm^2$ or 3100 $mJ/cm^2$.

6. The transferring method according to claim 1, wherein the liquid material layer is a liquid, UV-curable resin layer.

7. The transferring method according to claim 6, wherein the step of curing the liquid material layer comprises irradiating the liquid, UV-curable resin layer with a second UV ray, to form a solid, UV-cured resin layer.

8. The transferring method according to claim 7, wherein the step of releasing the solid material layer from the transfer mold comprises releasing the solid, UV-cured resin layer from the transfer mold.

9. The transferring method according to claim 6, wherein the step of forming the liquid, UV-curable resin layer on the transferring surface comprises:
   applying liquid, UV-curable resin onto the transferring surface;
   providing a polyethylene terephthalate (PET) substrate on the liquid, UV-curable resin; and
   enabling a pressure roller to rolling on the PET substrate in a predetermined direction, to form the liquid, UV-curable resin layer.

10. The transferring method according to claim 7, wherein the second UV ray has a power density of 60 $W/cm^3$ to 80 $W/cm^3$, and light energy of 800 $mJ/cm^2$ to 1200 $mJ/cm^2$.

11. The transferring method according to claim 10, wherein the second UV ray has a power density of 80 $W/cm^3$, and light energy of 800 $mJ/cm^2$ or 1000 $mJ/cm^2$.

12. A repeatable transferring method, comprising steps of:
    performing surface modification treatment on a transferring surface of a transfer mold to reduce surface free energy of the transferring surface, wherein, the surface modification treatment is performed at a temperature in a range from 0° C. to 60° C.;
    performing heat dissipation on the transfer mold while performing the surface modification treatment on the transferring surface of the transfer mold;
    forming a liquid material layer on the transferring surface after the surface modification treatment;
    curing the liquid material layer to form a solid material layer;
    releasing the solid material layer from the transfer mold; and
    taking the solid material layer as a new transfer mold, performing surface modification treatment on a transferring surface of the new transfer mold, to reduce surface free energy of the transferring surface, wherein, the surface modification treatment is performed at a temperature in a range from 0° C. to 60° C.; performing heat dissipation on the transfer mold while performing the surface modification treatment on the transferring surface of the transfer mold; forming a liquid material layer on the transferring surface after the surface modification treatment; curing the liquid material layer to form a solid material layer; and releasing the solid material layer from the new transfer mold.

13. The repeatable transferring method according to claim 12, wherein prior to the step of performing the surface modification treatment on the transferring surface of the transfer mold, the repeatable transferring method further comprises fixing the transfer mold onto a planar substrate.

14. The repeatable transferring method according to claim 13, wherein the step of fixing the transfer mold onto the planar substrate includes fixing the transfer mold onto a glass substrate through ultraviolet (UV)-curable resin.

* * * * *